June 22, 1943.　　　H. A. HENSEL　　　2,322,447

TIED SAUSAGE CASING AND METHOD FOR TYING

Filed June 25, 1938　　　2 Sheets-Sheet 1

Henry A. Hensel
INVENTOR.

BY

ATTORNEY.

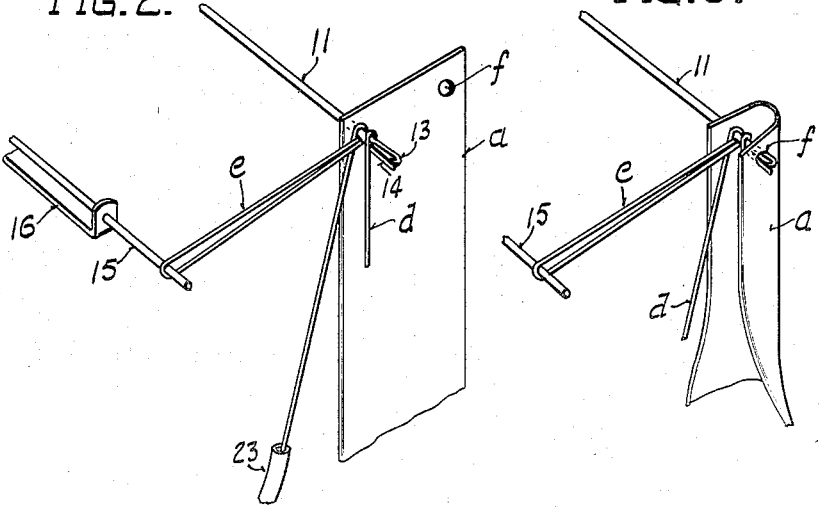
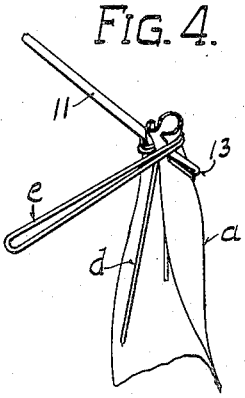
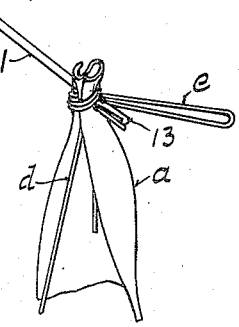
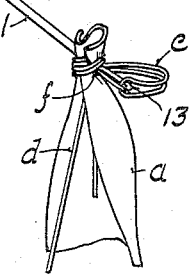
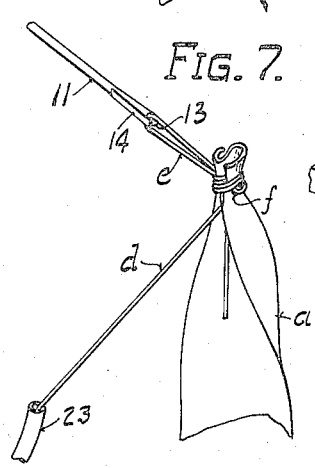
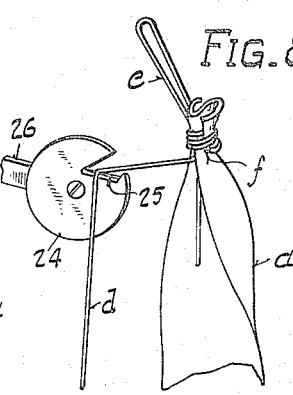
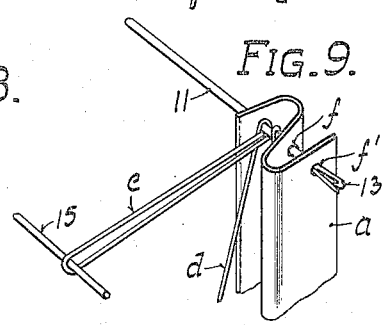

Patented June 22, 1943

2,322,447

UNITED STATES PATENT OFFICE 2,322,447

TIED SAUSAGE CASING AND METHOD FOR TYING

Henry A. Hensel, Milwaukee, Wis.

Application June 25, 1938, Serial No. 215,727

7 Claims. (Cl. 99—175)

This invention relates to sausage casings and particularly to a novel method for closing an end thereof.

Artificial casings, particularly those of Cellophane or like composition now commonly used in the production of the larger varieties of sausages, are produced in flat tubular form cut to the desired length. Preparatory to stuffing, the casing is closed at one end commonly by the use of a suitable cord wrapped, drawn and knotted about the casing, the purpose of the cord being to maintain the end of the casing closed against the relatively heavy internal pressures developed during stuffing and to provide a hanger or support for the stuffed sausage during the subsequent smoking process.

As heretofore applied, however, these cords frequently become loose or fail during the stuffing operation and many times fail, as supports, during the smoking process, and are thus a common cause of defective sausages and a substantial loss. Furthermore, as heretofore practiced, the application and tying of the cords, with the tightness and security required, is a difficult and tedious task and very hard on the hands and fingers of the tier.

These specific objections and difficulties are avoided by the use of the more recent method and apparatus disclosed in my prior Patents No. 2,042,227 and No. 2,114,077, by which closing of the casing end is effected by knotting the material of the casing upon itself in a peculiar manner. As therein disclosed, the knotting operation involves the step of passing or drawing the casing through itself, a step which requires a high degree of flexibility or pliability in the casing material which is attainable only by thoroughly wetting or soaking the same. However this method is objectionable in that it necessitates stuffing of the casing immediately after knotting, since the casing should be wet during stuffing. Rewetting adversely affects the material of the casing and maintaining the casing in a wet condition for indefinite periods is neither practicable nor desirable.

An object of the present invention is to provide a novel and effective method and means for securely closing a sausage casing end in a manner to avoid all of the objections and difficulties above mentioned. This I have accomplished by utilizing a cord to effect closing of the casing end and by so applying the cord as to assure absolute security without necessitating passage of the casing through itself.

Another object is to provide a sausage casing securely closed at one end by a tensioned cord penetrating the material thereof.

Another object is to provide a sausage casing securely closed at one end by a cord so attached and arranged that an intermediate portion of the cord constitutes an integral hanger loop.

Another object is to provide a novel method of closing a sausage casing end by a tensioned cord penetrating the material thereof.

Another object is to provide a novel method of wrapping and anchoring a cord about and to a sausage casing to close an end of the casing.

Another object is to provide a novel method of securely interlocking a cord with a sausage casing to close an end thereof.

Other more specific objects and advantages will appear, expressed or implied, from the following description of an illustrative method and apparatus for utilizing the present invention.

In the accompanying drawings:

Figs. 2 to 8 are views illustrating successive steps in the method of tying a casing sausage end in accordance with the present invention.

Fig. 9 is a view similar to Fig. 2 illustrating the first step of the same method as applied to larger sausage casings.

Figure 1:
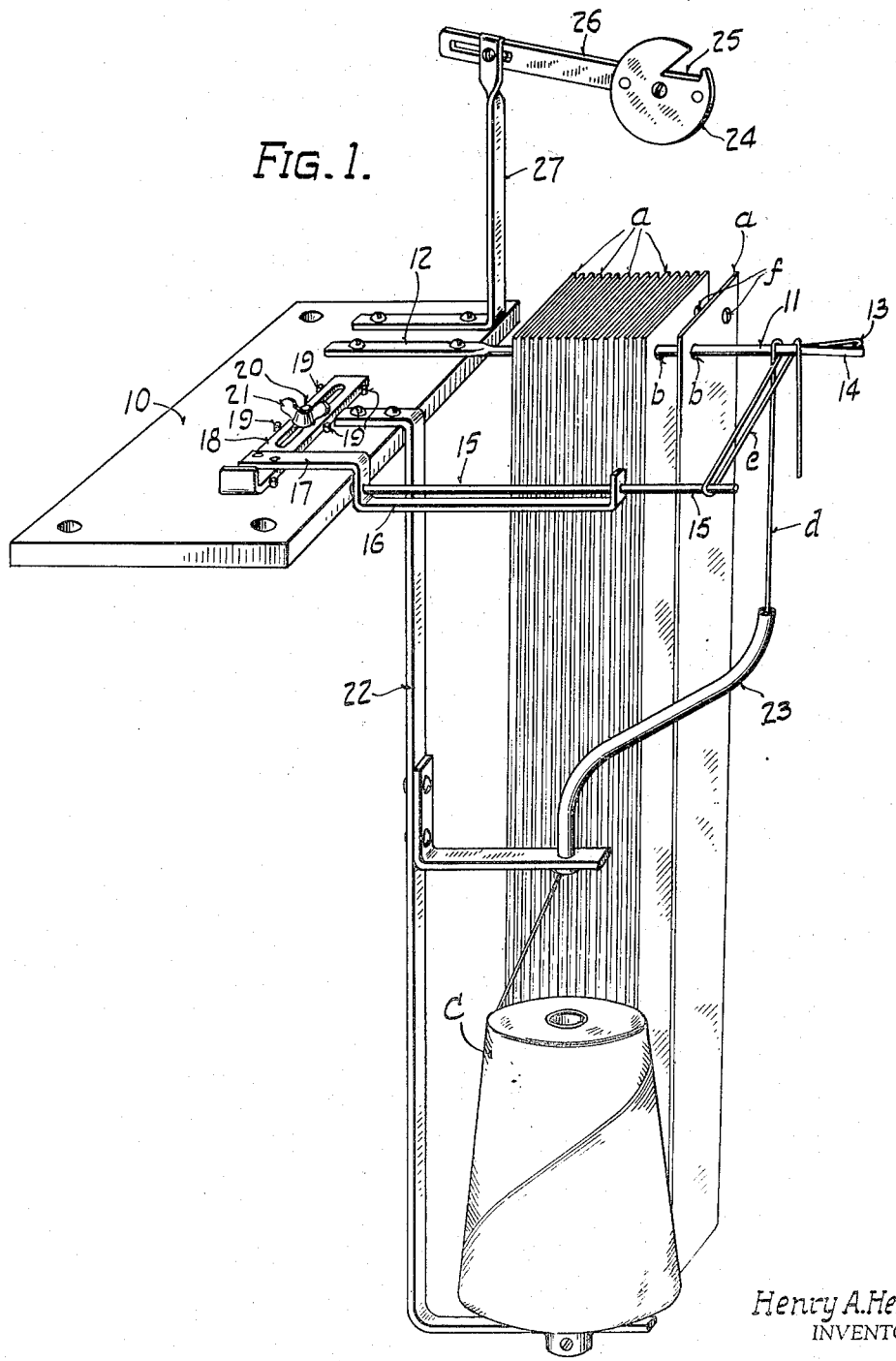
Figure 1 is a perspective view of an apparatus, constructed in accordance with the present invention, for tying and closing a sausage casing end.

The apparatus selected for illustration includes a supporting plate 10 adapted to be appropriately fixed in horizontal position upon the top surface of a suitable work bench or table preferably adjacent an edge of the latter. A slender rod 11, fixed at one end 12 to the plate 10 and projecting horizontally therefrom, provides an appropriate support for a multiplicity of artificial sausage casings a to be tied. Each of the casings is preferably perforated, as at b, to receive the rod 11 and to facilitate their threading onto the rod in the manner indicated.

The rod shown is equipped at its outer projecting end with a suitable cord gripper preferably in the form of an inturned hook 13, the throat of which is normally covered by a resilient strip 14, which merges at its inner end into the rod 11 and which constitutes in effect an extension of the latter. The purpose and function of this gripper will later be described.

The apparatus shown also includes a gauge finger 15, carried by the plate 10 and projecting therefrom in a direction parallel to but horizontally spaced from the rod 11. In this instance the gauge finger is in the form of a slender rod 15 fixed in a suitable bracket 16, which latter is attached at its inner end 17 to an appropriate carrier 18 adjustably fixed to the plate 10. The carrier shown comprises a slide plate 18 guided for longitudinal adjustment between appropriate lugs or pins 19, projecting from the top face of the plate 10, and fixed in any position of adjustment by appropriate means such as a bolt 20 and thumb nut 21. The arrangement is such that the spacing of the finger 15 from the rod 11 may be regulated at will by longitudinal adjustment of the slide plate 18.

The plate 10 also supports a bracket 22, fixed thereto and depending from the forward edge thereof, adapted to support an appropriate source of cord supply, such as a ball of cord c. A tube 23, carried by the bracket 22 above the ball of cord c, serves as a guide for the cord.

An appropriate razor or knife blade, carried by a disk 24 with its edge 25 exposed in an opening in the disk, constitutes a convenient cord cutter. The knife carrying disk 24 is conveniently arranged, preferably above and at one side of the casing carrier rod 11, and in this instance is shown carried by an arm 26 adjustably fixed to a suitable upright bracket 27 mounted upon the plate 10.

With the several parts of the apparatus arranged as shown, and with its supporting plate 10 securely fixed to the top of an appropriate work bench or table, the several sausage casings a threaded upon the supporting rod 11 are individually tied by cord d supplied from the ball c in the following manner.

Preparatory to tying, the free end of the cord d, as it emerges from the guide tube 23, is first drawn upwardly over and about the rod 11 in front of the casings a, thence upwardly over and about the gauge finger 15, and thence under and over the rod 11, so as to form a loop e of cord suspended between the rod 11 and finger 15, as indicated in Figs. 1, 2 and 3. The spacing of the finger 15 from the rod 11 of course determines the length of this loop.

It will be noted that each casing a is provided with an additional perforation f transversely spaced from the first mentioned perforation b, both perforations being preferably disposed close to the end of the casing.

This additional perforation f in the foremost casing a is then threaded over the projecting end of the rod 11, this casing, by this step in the process, being bent or folded so as to embrace those bight portions of the cord which constitute the base of the loop e and which are positioned on and about the rod 11.

The cord loop e is then withdrawn from the end of the finger 15 and tightly wrapped preferably a number of times about the casing a, as indicated in Figs. 4 and 5, to compress the end of the casing into a tight bundle. In thus wrapping the loop e, it is preferably passed underneath the rod 11 at the rear of the casing and over the rod at the front of the casing, so that it is in effect wrapped about the rod as well as about the casing.

The free end of the loop e is then passed beneath the resilient strip 14 into engagement with the hook 13, as indicated in Fig. 6, so as to be securely engaged by the latter, and the casing a with its cord wrappings held taut, is pulled off the end of the rod 11 and over the hook 13 to the position indicated in Fig. 7, thereby drawing the loop e through the casing and through the bights in the cord which had previously surrounded the rod 11. The wrappings of cord about the casing are then further tensioned by a final strong pull upon the casing and against the resistance of the hook 13, while the loop e is still engaged with the hook in the Fig. 7 position.

This results in an exceptionally secure and tight knotting of the cord about the casing end, so tight in fact as to close and actually seal the end of the casing against leakage of either air or liquid, and so secure as to eliminate all possibility of accidental removal of the knot.

That portion of the cord leading to the finished knot is then severed by passing the same over the knife edge 25 in the manner indicated in Fig. 8, so that the free end of the cord supply is then ready and available for the next tying operation.

It will be noted that in the finished knot, thus formed, both end portions of the cord are tightly embedded within a tight fold of the closed casing end and that both are also so engaged and entangled with that portion of the cord loop which extends through the casing end as to provide an absolutely secure and effective anchorage therefor. This engagement and entanglement of the loop with those end portions of the cord also assures the maintaining of an effective binding tension in the wrappings of the cord about the casing, and that, together with the fact that the wrappings involve a plurality of turns about the casing, explains the exceptional tightness and security of the knot. Moreover, the fact that the cord of the knot actually penetrates the material of the casing is ample assurance that the knot cannot be forced from the casing by the rather heavy internal pressures developed during subsequent stuffing of the casing.

It will also be noted that the loop e, extending from the finished knot, provides an appropriate hanger or support for the casing. It is the natural and automatic result of the knot formation described, and provides an integral closed loop without requiring the special step of tying together the ends of the cord, such as is required in the tying processes heretofore used.

The tying method above described may be applied, with little or no modification, to sausage casings of various sizes and weights. When applied to larger casings, an additional perforation or perforations is ordinarily provided in the casing, such as the third perforation f' in the casing a shown in Fig. 9. In tying such larger casing, the cord is first applied to and upon the supporting rod 11 and gauge finger 15 in the same manner as above described to form the loop e suspended therebetween and in front of the casing, and the additional perforations f and f' are then threaded over the end of the rod 11 with the casing reversely bent or folded, as indicated in Fig. 9. From that point on the tying process is performed in the same manner as above described.

The length of the cord loop e may of course be varied to suit the various sizes and weights of casings tied, or to accommodate more or less turns in the cord wrappings by adjustment of the slide plate 18 to thereby regulate the spacing between the rod 11 and finger 15.

Various changes may be made in the knot or the method or means for forming it as hereinabove specifically described without departing from or sacrificing the advantages of the invention as defined in the appended claims.

I claim:

1. The combination with a sausage casing, of a tie member knotted onto said casing, said tie member encircling said casing and having end portions engaged with another spaced portion of said member within a fold of said casing.

2. The method of tying sausage casings which comprises forming a bight in one portion of a cord, engaging said bight within a fold of the casing, applying another portion of said cord about the casing and in interlocking engagement therewith; threading a portion of said cord through said bight, and tensioning said cord.

3. The method of closing a sausage casing with an independent cord which consists in forming a bight in the cord, folding the casing to embrace said bight, wrapping a strand of the cord around the casing to thereby close the casing, passing a portion of said strand through the material of the casing and through said bight, and tensioning the cord to form a knot.

4. The method of closing a sausage casing with an independent cord which consists in doubling a cord upon itself to form a double strand having a looped end, forming a second loop in the double strand, folding the casing to embrace said second loop, wrapping the looped end of the double strand about the casing to thereby close the casing, passing the looped end of the cord through the material of the casing and through the second loop, and tensioning the cord to thereby form a knot.

5. The method of closing a sausage casing with an independent cord which consists in inserting a rod through the material of the casing, looping the cord about the rod, folding the casing and threading a second portion thereof onto said rod to thereby embrace said loop within the fold, wrapping a strand of the cord about the casing to thereby close the casing, engaging another portion of said strand with said rod, and drawing said rod and said last-named strand portion through the casing and through said loop to thereby form a knot.

6. A tie for a sausage casing comprising a cord having a bight within a longitudinal fold of said casing, and a strand wrapped around said casing and penetrating the material of said casing and said bight.

7. A tie for a sausage casing comprising a double cord having a looped end and having an additional loop embraced within a fold of said casing, the looped end of the cord being wrapped around the casing and penetrating said additional loop and the material of the casing to thereby form a knot closing said casing and a hanger loop integral therewith.

HENRY A. HENSEL.